United States Patent
Fischer et al.

(10) Patent No.: US 6,605,665 B1
(45) Date of Patent: Aug. 12, 2003

(54) MOLDING MATERIALS FOR USE IN MOTOR VEHICLE INTERIORS

(75) Inventors: Michael Fischer, Ludwigshafen (DE); Manfred Knoll, Wachenheim (DE); Christophe Ginss, Wolxheim (FR); Stephan Berz, Frankfurt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/889,402

(22) PCT Filed: Jan. 14, 2000

(86) PCT No.: PCT/EP00/00267

§ 371 (c)(1),
(2), (4) Date: Jul. 17, 2001

(87) PCT Pub. No.: WO00/44831

PCT Pub. Date: Aug. 3, 2000

(30) Foreign Application Priority Data

Jan. 27, 1999 (DE) .......................................... 199 03 073

(51) Int. Cl.⁷ .............................. C08L 67/00; C08K 7/02
(52) U.S. Cl. ....................... 524/504; 524/508; 524/514; 524/515; 524/522; 524/528
(58) Field of Search ................................. 524/504, 508, 524/514, 515, 522, 528

(56) References Cited

U.S. PATENT DOCUMENTS

| 4,535,124 A | 8/1985 | Binsack et al. ................ 525/67 |
| 5,219,915 A | 6/1993 | McKee et al. ............... 524/504 |

FOREIGN PATENT DOCUMENTS

| DE | 41 23 041 | 1/1993 |
| DE | 42 35 302 | 4/1994 |
| DE | 44 36 776 | 4/1996 |
| EP | 0 392 357 | 10/1990 |
| EP | 0 643 104 | 3/1995 |
| JP | 1011152 | 1/1989 |
| JP | 03263453 | 11/1991 |

Primary Examiner—Jeffrey Mullis
(74) Attorney, Agent, or Firm—Keil & Weinkauf

(57) ABSTRACT

A process for the preparation of fiber-reinforced moldings for motor vehicles wherein the molding comprises
 a) from 1 to 96.86% by weight of at least one polycondensate,
 b) from 1 to 12% by weight of at least one particulate graft copolymer whose soft phase has a glass transition temperature below 0° C. and whose median particle size is from 50 to 1000 nm,
 c) from 1 to 12% by weight of at least one copolymer made from the following monomers,
   c1) from 50 to 90% by weight of at least one vinylaromatic monomer, and
   c2) from 10 to 50% by weight of acrylonitrile and/or methacrylonitrile, based in each case on component c,
 d) from 0 to 20% by weight of
 e) from 0.01 to 15% by weight of a polycarbonate,
 f) from 0.01 to 2% by weight of a carbon black,
 g) from 0 to 12% by weight of a polymer other than component B,
 h) from 0 to 20% by weight of a polyester other than component A,
 i) from 0.1 to 10% by weight of conventional additives, such as UV stabilizers, oxidation retarders, lubricants and mold-release agents. Moldings and composites made from these molding compositions are as described as is the use of the molding compositions, the moldings and the composites.

10 Claims, No Drawings

MOLDING MATERIALS FOR USE IN MOTOR VEHICLE INTERIORS

The invention relates to fiber-reinforced molding compositions, moldings and composites made therefrom, and also to the use of the molding compositions, moldings and composites Moldings made from polymeric materials used in particular in the interior of motor vehicles have to meet high requirements, particularly for their mechanical properties, surface properties, aging performance and also odor performance. Various polymeric materials are currently used to produce moldings for interior applications in motor vehicles.

One material used is glass-fiber-reinforced ABS/PC (a polymer blend made from acrylonitrile/butadiene/styrene copolymer and polycarbonate). However, this material has inadequate UV resistance, poor flowability, poor heat-aging performance (toughness and elongation at break after heat aging), disadvantageous surface properties, in particular foam adhesion, poor foam adhesion and exhibits migration of the glass fibers out of the material, and in particular has poor odor performance. For the purposes of the present invention, odor performance relates to the tendency of materials to give off volatile constituents with a detectable odor after a given period of storage under particular temperature and humidity conditions.

Another material used is glass-fiber-reinforced, impact-modified SMA (styrene-maleic anhydride copolymer). SMA, too, has inadequate surface properties, poor heat-aging resistance, and in particular adverse heat resistance and poor odor performance.

Another material which may be considered for producing moldings for automotive interiors is PPE/HIPS GF (a polymer blend made from polyphenylene ether and high-impact polystyrene, and also glass fibers). This material likewise has poor flowability, poor surface properties, in particular the migration of the glass fibers out of the material, giving a rough surface, poor UV resistance, poor heat aging and, finally, poor odor performance.

Another material suitable for interior applications in motor vehicles is PP/mineral/EPDM. This is a polymer blend composed of polypropylene, a mineral filler and an ethylene-propylene-diene terpolymer. This material, too, has poor stiffness, poor foam adhesion and poor coatability.

The abovementioned materials, other than mineral-reinforced PP, also have poor heat resistance, expressed in terms of a low Vicat B softening point (Vicat B <130° C.). However, good heat resistance and heat-aging resistance are essential in the materials used, since the temperature in motor vehicle interiors can rise considerably, in particular as a result of insolation.

DE 41 23 041 A1 relates to a thermoplastic molding composition comprising, as principal component and in addition to other components, from 40 to 90 parts by weight of a thermoplastic aromatic polycarbonate.

DE 44 36 776 A1 relates to a thermoplastic polycarbonate molding composition with from 50 to 95% by weight of a thermoplastic aromatic polycarbonate as principal constituent.

CA-JP 03-263453 A relates to a solvent-resistant thermoplastic molding composition made essentially from polycarbonate and polybutylene terephthalate, with steel-fiber reinforcement.

It is an object of the present invention to provide molding compositions suitable for producing moldings which are used in the interior of motor vehicles. The molding compositions are to have an advantageous property profile in relation to their mechanical, optical and sensory properties, and in particular have good heat resistance and heat-aging resistance and good emission performance and/or odor performance. The molding compositions should moreover have a very low density. The low density is advantageous particularly with regard to saving fuel in motor vehicles. Laser-marking, preferably laser-inscription, of the surface of the molding composition is also desirable. This permits the surface to be designed in a manner which is technically simple and highly precise. The molding compositions should, in addition, have very low emission of volatile constituents, so that the novel molding compositions can be used to produce moldings which have preferably metallized, heat-resistant surfaces and are particularly used in headlamps. The surfaces of the moldings made from the novel molding compositions should also give good adhesion to foams.

We have found that this object is achieved by a fiber-reinforced molding composition comprising, based on the total of components A to F, and, if used, G to I, which in total give 100% by weight, a) as component A, from 1 to 96,86% by weight of at least one polycondensate, b) as component B, from 1 to 12% by weight of at least one particulate graft copolymer whose soft phase has a glass transition temperature below 0° C., and whose median particle size is from 50 to 1000 nm, c) as component C, from 1 to 12% by weight of at least one copolymer made from the following monomers, c1) as component C1, from 50 to 90% by weight of at least one vinylaromatic monomer, and c2) as component C2, from 10 to 50% by weight of acrylonitrile and/or methacrylonitrile, based in each case on component C, d) as component D, from 1 to 20% by weight of fibers, e) as component E, from 0.01 to 15% by weight of a polycarbonate, f) as component F, from 0.01 to 2% by weight of a carbon black, g) as component G, from 0 to 12% by weight of a polymer other than component B, h) as component H, from: 0 to 20% by weight of a polyester other than component A, i) as component I, from 0.1 to 10% by weight of conventional additives, such as UV stabilizers, pigments, oxidation retarders, lubricants and mold-release agents.

The component A present in the novel molding composition is the balancing constituent of the molding composition making up 100% by weight, i.e. in the present makeup of the molding composition up to 96.86% by weight, preferably from 20 to 75% by weight, particularly preferably from 30 to 60% by weight, of a preferably fusible polycondensate which is preferably not a polycarbonate, preferably of a polyester and particularly preferably of an aromatic polyester. The polycondensates present in the novel molding compositions are known per se.

Component A preferably has a viscosity number of from 90 to 160, particularly preferably from 100 to 140.

The polyester may preferably be prepared by reacting terephthalic acid, its esters or other ester-forming derivatives with 1,4-butanediol, 1,3-propanediol or, respectively, 1,2-ethanediol in a manner known per se.

Up to 20 mol % of the terephthalic acid may be replaced by other dicarboxylic acids. Mention may be made here, merely as examples, of naphthalene dicarboxylic acids, isophthalic acid, adipic acid, azelaic acid, sebacic acid, dodecanedioic acid and cyclohexanedicarboxylic acids, mixtures of these carboxylic acids and ester-forming derivatives of the same.

Up to 20 mol % of the dihydroxy compounds 1,4-butanediol, 1,3-propanediol and respectively, 1,2-ethanediol may also be replaced by other dihydroxy compounds, e.g. 1,6-hexanediol, 1,4-hexanediol, 1,4-cyclohexanediol, 1,4-di (hydroxy-methyl)cyclohexane, bisphenol A, neopentyl glycol, mixtures of these diols or else ester-forming derivatives of the same.

Other preferred aromatic polyesters are polytrimethylene terephthalate (PTT) and in particular polybutylene terephthalate (PBT), formed exclusively from terephthalic acid with the corresponding diols 1,2-ethanediol, 1,3-propanediol and 1,4-butanediol. Some or all of the aromatic polyesters used may be in the form of recycled polyester materials, such as PET regrind from bottle material or from bottle production waste.

In a particularly preferred embodiment component A is composed of a1) from 60 to 100% by weight, preferably from 80 to 100% by weight, particularly preferably from 90 to 100% by weight, of polybutylene terephthalate, and a2) from 0 to 40% by weight, preferably from 0 to 20% by weight, particularly preferably from 0 to 10% by weight, of another polycondensate.

In another embodiment of the invention the molding composition comprises no PET. Preference is moreover given to molding compositions in which component A is PET-free.

The novel molding composition comprises, as component B, from 1 to 50% by weight, preferably from 1.5 to 15% by weight, particularly preferably from 3 to 10% by weight, in particular from 3 to 8% by weight, of at least one particulate graft copolymer whose soft phase has a glass transition temperature below 0° C. and whose median particle size is from 50 to 1000 nm.

Component B is preferably a graft copolymer made from b1) from 50 to 90% by weight of a particulate graft base B1 with a glass transition temperature below 0° C., and b2) from 10 to 50% by weight of a graft B2 made from the following monomers b21) as component B21, from 50 to 90% by weight of a vinylaromatic monomer, and b22) as component B22, from 10 to 50% by weight of acrylonitrile and/or methacrylonitrile.

The particulate graft base B1 may be composed of from 70 to 100% by weight of a conjugated $C_1$–$C_{10}$ diene and preferably of a $C_1$–$C_{10}$-alkyl acrylate, and of from 0 to 30% by weight of a bifunctional monomer having two non-conjugated olefinic double bonds. Graft bases of this type are used, for example, as component B in ABS polymers or MBS polymers.

In a preferred embodiment of the invention the graft base B1 is composed of the following monomers:

b11) as component B11, from 75 to 99.9% by weight of a $C_1$–$C_{10}$-alkyl acrylate, b12) as component B12, from 0.1 to 10% by weight of at least one polyfunctional monomer having at least two non-conjugated olefinic double bonds, and b13) as component B13, from 0 to 24.9% by weight of one or more other copolymerizable monomers.

The graft base B1 is an elastomer whose glass transition temperature is preferably below −20° C., particularly preferably below −30° C.

The main monomers B11 used to prepare the elastomer are acrylates having from 1 to 10 carbon atoms, in particular from 4 to 8 carbon atoms, in the alcohol component. Particularly preferred monomers B11 are isobutyl and n-butyl acrylate, and also 2-ethylhexyl acrylate, particularly preferably butyl acrylate.

Besides the acrylates, the crosslinking monomer B12 used is from 0.1 to 10% by weight, preferably from 0.1 to 5% by weight, particularly preferably from 1 to 4% by weight, of a polyfunctional monomer having at least two non-conjugated olefinic double bonds. Examples of these are divinylbenzene, diallyl fumarate, diallyl phthalate, triallyl cyanurate, triallyl isocyanurate, tricyclodecenyl acrylate and dihydrodicyclopentadienyl acrylate, particularly preferably the latter two.

Besides the monomers B11 and B12, the structure of the graft base B1 may also involve up to 24.9% by weight, preferably up to 20% by weight, of other copolymerizable monomers, preferably 1,3-butadiene, styrene, α-methylstyrene, acrylonitrile, methacrylonitrile and $C_1$–$C_8$-alkyl methacrylates, or mixtures of these monomers. In a particularly preferred embodiment no 1,3-butadiene is present in the graft base B1, and the graft base B1 in particular is composed exclusively of components B11 and B12.

Grafted onto the graft base B1 there is a graft B2 made from the following monomers:

b21) as component B21, from 50 to 90% by weight, preferably from 60 to 90% by weight, particularly preferably from 65 to 80% by weight, of a vinylaromatic monomer, and b22) as component B22, from 10 to 50% by weight, preferably from 10 to 40% by weight, particularly preferably from 20 to 35% by weight, of acrylonitrile or methacrylonitrile or mixtures of these.

Examples of vinylaromatic monomers are unsubstituted styrene and substituted styrenes, such as α-methylstyrene, p-chlorostyrene and p-chloro-α-methylstyrene. Preference is given to unsubstituted styrene and α-methylstyrene, particularly unsubstituted styrene.

In one embodiment of the invention the median particle size of component B is from 50 to 200 nm, preferably from 55 to 150 nm.

In another embodiment of the invention the median particle size of component B is from 200 to 1000 nm, preferably from 400 to 550 nm.

In another preferred embodiment of the invention component B has bimodal particle size distribution and is composed of from 10 to 90% by weight, preferably from 30 to 90% by weight, particularly preferably from 50 to 75% by weight, of a fine-particle graft copolymer with a median particle size of from 50 to 200 nm, preferably from 55 to 150 nm, and from 10 to 90% by weight, preferably from 10 to 70% by weight, particularly preferably from 25 to 50% by weight, of a coarse-particle graft copolymer with a median particle size of from 250 to 1000 nm, preferably from about 400 to 550 nm.

The median particle size and particle size distribution given are the sizes determined from the integral mass distribution. The median particle sizes according to the invention are in all cases the ponderal median of the particle sizes. The determination of these is based on the method of W. Scholtan and H. Lange, Kolloid-Z. und Z.-Polymere 250 (1972), pages 782–796, using an analytical ultracentrifuge. The ultracentrifuge measurement gives the integral mass distribution of the particle diameter in a specimen. From this it is possible to deduce what percentage by weight of the particles has a diameter identical to or smaller than a particular size. The median particle diameter, which is also termed the $d_{50}$ of the integral mass distribution, is defined here as the particle diameter at which 50% by weight of the particles have a diameter smaller than that corresponding to the $d_{50}$. Equally, 50% by weight of the particles then have a larger diameter than the $d_{50}$. To describe the breadth of the particle size distribution of the rubber particles, the $d_{10}$ and $d_{90}$ given by the integral mass distribution are utilized alongside the $d_{50}$ (median particle diameter). The $d_{10}$ and $d_{90}$ of the integral mass distribution are defined similarly to the $d_{50}$ with the difference that they are based on, respectively, 10 and 90% by weight of the particles. The quotient $$(d_{90}-d_{10})/d_{50}=Q$$

is a measure of the breadth of the particle size distribution. Emulsion polymers A which can be used according to the invention as component A preferably have Q less than 0.5, in particular less than 0.35.

The graft copolymer B generally has one or more stages, i.e. it is a polymer composed of a core and of one or more shells. The polymer is composed of a base (graft core) B1 and of, grafted onto this, one, or preferably more than one, stages B2 (graft), known as grafts or graft shells.

By grafting one or more times it is possible to apply one or more graft shells to the rubber particles. Each graft shell may have a different makeup. In addition to the grafting monomers and together with these, polyfunctional crosslinking monomers or monomers containing reactive groups may be grafted on (see, for example, EP-A 0 230 282, DE-A 36 01 419, EP-A 0 269 861).

In one embodiment of the invention crosslinked acrylate polymers with a glass transition temperature below 0° C. serve as graft base B1. The crosslinked acrylate polymers should preferably have a glass transition temperature below −20° C., in particular below −30° C.

In principle the structure of the graft copolymer may also have two or more layers, where at least one inner layer should have a glass transition temperature below 0° C. and the outermost layer should have a glass transition temperature above 23° C.

In a preferred embodiment the graft B2 is composed of at least one graft shell. The outermost graft shell of these has a glass transition temperature above 30° C. A polymer formed from the monomers of the graft B2 would have a glass transition temperature above 80° C.

Suitable preparation processes for graft copolymers B are emulsion, solution, bulk and suspension polymerization. The graft copolymers B are preferably prepared by free-radical emulsion polymerization, at temperatures of from 20 to 90° C. using water-soluble and/or oil-soluble initiators, such as peroxodisulfate or benzoyl peroxide, or with the aid of redox initiators. Redox initiators are also suitable for polymerization below 20° C.

Suitable emulsion polymerization processes are described in DE-A-28 26 925, DE-A31 49 358 and in DE-C-12 60 135.

The graft shells are preferably built up in the emulsion polymerization process as described in DE-A-32 27 555, 31 49 357, 31 49 358 and 34 14 118. The specified setting of the particle sizes according to the invention at from 50 to 1000 nm preferably takes place by the methods described in DE-C-12 60 135 and DE-A-28 26 925, or in Applied Polymer Science, Vol. 9 (1965), page 2929. The use of polymers with different particle sizes is known, for example, from DE-A-28 26 925 and U.S. Pat. No. 5,196,480.

The novel molding compositions comprise, as component C, from 1 to 50% by weight, preferably from 7.5 to 20% by weight, particularly preferably from 10 to 18% by weight, of a copolymer made from the following monomers:

c1) as component C1, from 75 to 90% by weight, preferably from 77 to 90% by weight, particularly preferably from 81 to 90% by weight, of at least one vinylaromatic monomer, and c2) as component C2, from 10 to 25% by weight, preferably from 10 to 23% by weight, particularly preferably from 10 to 19% by weight, in particular from 15 to 19% by weight, of acrylonitrile and/or methacrylonitrile.

Suitable vinylaromatic monomers are the abovementioned monomers C1 and the vinylaromatic monomers mentioned above as component B21. Component C is preferably an amorphous polymer as described above as graft B2. In one embodiment of the invention component C comprises a copolymer of styrene and/or α-methylstyrene with acrylonitrile. The acrylonitrile content in these copolymers of component C here is not above 25% by weight and is generally from 10 to 25% by weight, preferably from 10 to 22% by weight, particularly preferably from 10 to 19% by weight, in particular from 15 to 19% by weight. Component C also includes the free, ungrafted styrene-acrylonitrile copolymers produced during the graft copolymerization to prepare component B. Depending on the conditions selected in the graft copolymerization for preparing the graft copolymer B, it may be possible that a sufficient proportion of component C may already have been formed during the graft copolymerization. However, it will generally be necessary for the products obtained during the graft copolymerization to be blended with additional and separately prepared component C.

This additional and separately prepared component C may preferably be a styrene-acrylonitrile copolymer, an α-methylstyrene-acrylonitrile copolymer or an α-methylstyrene-styrene-acrylonitrile terpolymer. It is important that the acrylonitrile content in the copolymers C does not exceed 25% by weight, in particular 19% by weight. The copolymers may be used for component C either individually or as a mixture, and the additional and separately prepared component C of the novel molding compositions may, for example, therefore be a mixture of a styrene-acrylonitrile copolymer (PSAN) and an α-methylstyrene-acrylonitrile copolymer.

The acrylonitrile content of the different copolymers of component C may also vary. However, component C is preferably composed simply of one or more styrene-acrylonitrile copolymers, which may have differing acrylonitrile contents. In a particularly preferred embodiment component C is composed simply of one styrene-acrylonitrile copolymer.

The novel molding compositions comprise, as component D, from 1 to 20% by weight, preferably from 5 to 18% by weight, particularly preferably from 10 to 18% by weight, in particular from 10 to 15% by weight, of fibers. These are commercially available products.

The average length of these in the molding composition is generally from 0.1 to 0.5 mm, preferably from 0.1 to 0.4 mm, and their diameter is generally from 6 to 20 µm. Preference is given to glass fibers and mineral fibers, in particular glass fibers, preferably made from E glass. To achieve better adhesion, the fibers may have been coated with organosilanes, epoxysilanes or other polymer coatings.

The novel molding compositions comprise, as component E, from 0.01 to 15% by weight, preferably from 0.1 to 12% by weight and particularly preferably from 4 to 10% by weight, of a polycarbonate, based on the molding composition. Suitable polycarbonates are any of those known to the skilled worker, and those which are fusible are particularly suitable. In this connection reference is made to Polymer Chemistry, An Introduction, 2$^{nd}$ Edition, Malcolm P. Stevens, Oxford University Press, 1990, pages 400 –403 and, Principles of Polymerisation, 2$^{nd}$ Edition , George Odian, Wiley Interscience Publication John Wiley & Sons, 1981, pages 146 –149. Particularly suitable polycarbonates have high flowability, preferably an MVR of >9, preferably >15 and particularly preferably >20 at 300° C. and 1.2 kg, and preferred components E have an MVR of not more than 100, preferably 90 and particularly preferably 50. A particularly preferred component E is Lexan 121R from General Electric Plastics. The use of recycled PC material, in the form either of postindustrial or postconsumer recycled material has proven particularly suitable since it is particularly easy to process.

The novel molding compositions also comprise, as component F from 0.01 to 2% by weight, preferably from 0.1 to 0.5% by weight and particularly preferably from 0.1 to 0.3% by weight, of a carbon black, based on the molding composition. According to the invention, any carbon black known to the skilled worker is suitable as component F. Particular preference is given to acetylene black or carbon black produced by the combustion of mineral oil residues or natural gas rich in hydrocarbons or naphthalene, tar oils or tar, with less than the required amount of air feed or, respectively, cooling the combustion gases rapidly. The laser-markability and in particular laser-inscribability of the novel molding compositions with high contrast is made possible by their carbon black content.

The novel molding compositions may comprise, as component G, from 0 to 12% by weight, preferably from 0 to 10% by weight and particularly preferably from 4 to 8% by weight, of polymers other than B, preferably those homogeneously miscible with or dispersible in components A and/or C. Use may preferably be made of conventional (grafted) rubbers, such as ethylene-vinyl acetate rubbers, silicone rubbers, polyether rubbers, hydrogenated diene rubbers, polyalkenamer rubbers, acrylate rubbers, ethylene-propylene rubbers, ethylene-propylene-diene rubbers or butyl rubbers, methyl methacrylate-butadiene-styrene (MBS) rubbers, methyl methacrylate-butyl acrylate-styrene rubbers, preferably where these are miscible with or dispersible in the mixed phase formed from components A, B and C. Preference is given to acrylate rubbers, ethylene-propylene (EP) rubbers and ethylene-propylenedine (EPDM) rubbers, in particular as graft copolymers. It is also possible to use polymers or copolymers miscible or compatible with the mixed phase formed from components B and C, for example polyacrylates, polymethacrylates, in particular PMMA, polyphenylene ethers or syndiotactic polystyrene. It is also possible in particular to use reactive rubbers which link to the polyester (component A) via a covalent bond, for example particulate acrylate rubbers and/or polyolefin rubbers grafted with anhydrides, such as maleic anhydride, or with epoxy compounds, such as glycidyl methacrylate. Finally, it is also possible to use one or more polymers or copolymers which are present at the boundary between the amorphous phase formed from components B and/or C and the crystalline or semicrystalline phase formed from component A, and thus improve the adhesion between the two phases. Examples of polymers of this type are graft copolymers made from PBT and PSAN and segmented copolymers, such as block copolymers or multiblock copolymers made from at least one segment of PBT with $M_W$>1000 and at least one segment of PSAN or a segment compatible/miscible with PSAN with $M_W$>1000.

The novel molding composition also comprises, as component H, from 0 to 20% by weight, preferably from 0 to 15% by weight and particularly preferably from 0 to 10% by weight, based on the total molding composition, of a polyester other than component A. The polyester of component H has at least 50% by weight, preferably at least 70% by weight and particularly preferably 100% by weight, of polyethylene terephthalate (PET), based on the component H. Preferred other polyesters of component H are the aromatic polyesters defined above. The PET used may either derive directly from synthesis or be in the form of recycled material, preferably made from PET bottle regrind. The use of recycled PET materials is attractive firstly for reasons of cost and secondly since the recycled PET material has the effect of improving the toughness of the molding composition. The PET used according to the invention in component H preferably comprises at least 50% by weight, by preference at least 80% by weight and particularly preferably 100% by weight of recycled PET material.

The novel molding compositions comprise, as component I, from 0.1 to 10% by weight of conventional additives. Examples of additives of this type are: UV stabilizers, transesterification stabilizers, oxidation retarders, lubricants, mold-release agents, dyes, pigments, colorants, nucleating agents, antistats, antioxidants, stabilizers to improve thermal stability, to increase light stability, to raise hydrolysis resistance and chemicals resistance, agents to prevent decomposition by heat, and in particular the lubricants useful for producing moldings. These other additives may be metered in at any stage of the preparation process, but preferably at an early juncture so as to make use at an early stage of the stabilizing effects (or other specific effects) of the additive. Heat stabilizers or oxidation retarders are usually metal halides (chlorides, bromides or iodides) derived from metals in Group I of the Periodic Table of the Elements (for example Li, Na, K or Cu).

Suitable stabilizers are the usual sterically hindered phenols, or else vitamin E or compounds of similar structure. HALS stabilizers (hindered amine light stabilizers) are also suitable, as are benzophenones, resorcinols, salicylates, benzotriazoles and other compounds (for example Irganox®, Tinuvin®, such as Tinuvin® 770 (HALS absorbers, bis(2,2,6,6-tetramethyl-4-piperidyl) sebacate) or Tinuvin® P (UV absorber-(2H-benzotriazol-2-yl)-4-methylphenol) or Topanol®). The amounts of these usually used are up to 2% by weight, based on the entire mixture.

Examples of suitable transesterification stabilizers are organic phosphonites, such as tetrakis(2,4-di-tert-butylphenyl) bisphenylenediphosphonite (Irgaphos® PEPQ from Ciba Geigy AG) and also monozinc phosphate (mono- or dihydrate). The transesterification stabilizers may, for example, be used in powder form or as PBT masterbatches.

Suitable lubricants and mold-release agents are stearic acids, stearyl alcohol, stearates and generally higher fatty acids, derivatives of these and corresponding fatty acid mixtures having from 12 to 30 carbon atoms. The amounts of these additives are from 0.05 to 1% by weight.

Other possible additives are silicone oils, oligomeric isobutylene and similar substances. The amounts are usually from 0.05 to 5% by weight. Use may likewise be made of pigments, dyes, optical brighteners, such as ultramarine blue, phthalocyariines, titanium dioxide, cadmium sulfides or derivatives of perylenetetracarboxylic acid.

Processing aids and stabilizers, such as UV stabilizers, lubricants and antistats are generally used in amounts of from 0.01 to 5% by weight, based on the entire molding composition.

It is also possible to use amounts of, for example, up to 5% by weight, based on the entire molding composition, of nucleating agents, such as talc, calcium fluoride, sodium phenylphosphinate, alumina or fine-particle polytetrafluoroethylene. Amounts of up to 5% by weight, based on the molding composition, of plasticizers, such as dioctyl phthalate, dibenzyl phthalate, butyl benzyl phthalate, hydrocarbon oils, N-(n-butyl)benzenesulfonamide, or o- or p-tolueneethylsulfonamide are advantageously added. It is also possible to add amounts of up to 5% by weight, based on the molding composition, of colorants, such as dyes or pigments.

It is also preferable for the novel molding composition to comprise a component G with a copolymer which contains no butadiene derivative or no isoprene derivative, or neither of these.

In another embodiment of the novel molding composition it is preferable that none of the graft copolymers used in the molding composition contains a butadiene derivative or an isoprene derivative, or neither of these.

Another preferred novel molding composition contains no butadiene derivative or no isoprene derivative or neither of these.

Preferred derivatives are butadiene and isoprene.

Components A to I may be mixed in any known manner using any known method. The components may be mixed as they stand or else in the form of mixtures of one of the components with one or more of the others. For example, component B may be premixed with some or all of component C and then mixed with the other components. If components B and C have been prepared by, for example, emulsion polymerization it is possible to mix the resultant polymer dispersions with one another and then to precipitate the polymers together and work up the polymer mixture. However, it is preferable for components B and C to be blended by extruding, kneading or milling the components together, components B and C having previously been isolated, if required, from the aqueous dispersion or solution obtained during the polymerization. The novel thermoplastic molding compositions may, for example, be prepared by mixing component A with each of components B and C or with a mixture of these and, where appropriate, mixing with the other components, melting in an extruder and introducing the fibers via an inlet to the extruder.

Prior to processing in a mixing apparatus, component E may be mixed with the other components of the molding composition by the "cold-feed process", i.e. at below the melting point of the components. However, it is preferable for component E to be introduced by the "hot-feed process", i.e. in the melt, to the other components of the molding composition, for incorporation into the molding composition. According to the invention the "hot-feed process" is preferably carried out at from 250 to 280° C., particularly preferably at from 260 to 270° C.

In another embodiment of the novel process it is advantageous for component D likewise to be incorporated into the other components of the molding composition by addition to these components using the "hot-feed process".

According to the invention it has proven particularly successful to incorporate each of components D and E into the molding composition independently of one another, i.e. without premixing them with one another, via addition to the other components using the "hot-feed process".

Moldings may be produced by the known thermoplastic processing methods from the novel thermoplastic molding compositions. In particular, they may be produced by thermoforming, extrusion, injection molding, calendering, blow molding, compression molding, pressure sintering or sintering, preferably by injection molding. The moldings which can be produced from the novel molding compositions are also provided by the present invention.

The moldings produced from the novel molding compositions have only low levels of emissions of volatile constituents with detectable odor. The odor performance of polymeric materials is assessed to DIN 50011/PV 3900 and applies to components for the interiors of motor vehicles. The result of the odor test to this Standard is generally better than grade 5, preferably better than grade 4.5 and particularly preferably better than grade 4. The carbon emission from the moldings to PV 3341 is generally <50 $\mu$g/g, preferably <40 $\mu$g/g, particularly preferably <35 $\mu$g/g. The lower limit is preferably 20 $\mu$g/g.

The novel moldings also have good heat resistance. The Vicat B softening point is generally >130° C., preferably >135° C., particularly preferably >138° C. The upper limit of the Vicat B softening point is preferably 160° C.

The novel moldings also have good heat-aging performance. For example, the impact strength of the novel moldings to ISO 179/1eU after 1000 hours of heat aging at 130° C. is generally >25 kJ per m$^2$, preferably >30 kJ per m$^2$. The elongation at break of the novel moldings after 1000 hours of heat aging at 130° C. is generally >1.5%, preferably >2% and particularly preferably >2.5%. The reduction in impact strength to ISO 179/1eU after 1000 h of heat aging at 120° C. is <30%, preferably <10%, compared with the value prior to heat aging. The elongation at break to DIN 53457 after 1000 h of heat aging at 130° C. has been successfully proven at >2.5%, but not more than 5%.

The novel moldings also have good mechanical properties. For example, their modulus of elasticity is generally >3000 MPa, preferably >4500 MPa, but preferably not more than 10,000 MPa, their yield stress is generally >80 MPa, preferably >85 MPa, but preferably not more than 120 MPa, their impact strength to ISO 179/1eU is generally >45 kJ/m$^2$, preferably >48 kJ/m$^2$, their impact strength without prior heat aging to ISO 179 /1eA is generally >6 kj/m$^2$, but in each case below 75 kj/m$^2$, and their HDT B (measured to ISO 75, procedure B) is generally >190° C., preferably >200° C., but not more than 230° C., and their flowability as MVR (melt volume rate 275° C./2.16 kp applied force to ISO 1133) is >10 cm$^3$/10 min, preferably >14 cm$^{3/10}$ min, but not more than 30 cm$^3$/10 min. Compressive strength of from 20 to 100 kPa to DIN 53577 at from 20 to 60% compression is also preferred for the novel molding compositions.

Even after 1000 h of heat aging at 130° C., the novel moldings do not show any splintering in the penetration test (2 and 3 mm plaque diameter, to ISO 6603/2) at –30° C.

According to the invention, furthermore, the specific gravity of the molding composition is from 1.2 to 1.4, preferably from 1.25 to 1.35 and particularly preferably from 1.28 to 1.33.

The high heat resistance, good heat-aging resistance, good mechanical properties and good surface properties of the novel molding compositions make them suitable for a wide variety of moldings in which these molding compositions are present. Merely as examples, mention may be made of: camera cases, cases for mobile telephones, tube sections for binoculars, vapor ducts for vapor-extraction hoods, parts for pressure cookers, housings for hot-air grilles and pump housings.

The abovementioned properties make the novel moldings particularly suitable for applications in motor vehicles.

Examples of novel moldings produced in particular from the novel molding compositions are parts such as light-switch housings, lamp housings, housings for the central electrical system, multipoint connectors, plug connectors, housings for ABS controls, and identification plate supports, and also roof racks.

The good emission performance of the novel moldings makes them particularly suitable for applications in motor vehicle interiors. The novel moldings produced from the novel molding compositions are therefore preferably protective coverings, storage compartments, dashboard supports, door breasts, parts for the center console, and also retaining elements for radio and air-conditioning system, covers for the center console, covers for radio, air-conditioning system and ash tray, prolongations of the center console, storage pockets, storage areas for the driver's door and the passenger's door, storage areas for the center console, components for the driver's and passenger's seats, such as seat coverings, defroster ducts, internal mirror housings, sun-roof elements, such as sun-roof frames, covers and protective surrounds for instruments, instrument sockets, upper and lower shells for the steering column, air ducts, air blowers and adapters for personal air-flow devices and defroster ducts, door side coverings, coverings in the knee area, air-outlet nozzles, defroster apertures, switches and levers, and also air-filter ducts and ventilation ducts, and in particular reinforcing parts of these. These applications are merely examples of possible applications in motor vehicle interiors. The novel moldings are particularly preferably laser-markable.

Preference is also given to moldings for exterior bodywork parts, in particular fenders, tailgates, side paneling, bumpers, paneling, identification plate supports, panels, sunroofs, sunroof frames, and also impact protectors and constituents of these.

Other applications which may be mentioned as other moldings not restricted to the motor vehicle sector are boat hulls, lawnmower housings, garden furniture, motorcycle parts, camera cases, cases for mobile telephones, tube sections for binoculars, vapor ducts for vapor-extraction hoods, parts for pressure cookers, housings for hot-air grilles and pump housings.

The molding composition has proven especially useful in moldings such as plug connectors and housing parts, and in particular for large vehicle electronics, in particular electronics for ABS/ASC, for transmission systems for ESP, for seats, for mirror motors, for window-lifter motors, for retractable roofs, for airbag triggering, for passenger compartment safety, for acceleration sensors, and for ignition electronics, and also in electronics for detecting seat occupation. Other preferred uses of the novel molding composition are for locking-system housings, autorelays and covers for wiper housings, and also for lock housings. Another preferred group of moldings which can be produced from the novel molding compositions is that of gas meter housings, wind deflectors, actuating-motor housings, where the actuating motors are preferably used in automotive construction, parts for power drills, parts for ovens, in particular to insulate from heat, for example knobs and oven handles, screen wiper parts, in particular wiper-blade retainers, spoilers, mirror support plates for motor vehicle mirrors, and also housings for washing machine control systems.

The novel molding compositions are also suitable for other moldings used in the household sector, preferably in the kitchen sector. These include bread-baking machines, toasters, table grills, kitchen machinery, electric tin-openers and juice presses. In these products it is preferably the switches, housings, handles and covers which are produced from the novel molding compositions. The novel molding compositions may also be used for moldings in stoves, preferably stove handles, stove knobs and switches.

The novel molding compositions may also be used in moldings which meet the requirements of the Federal Drug Administration or of comparable national authorities in other countries. In this sector particular preference is given to packaging for pharmaceutical products and packs for pharmaceutical kits.

The novel molding compositions may also be used in the food and drink packaging sector. Preference is given here to moldings such as boxes, pots, dishes and other types of container made from the novel molding compositions.

When considering the uses for the novel molding compositions, particular emphasis should be given to their safety in contact with food and drink and to their resistance to fats and liquids, particularly advantageous in parts for household devices.

The use of the molding compositions defined above has proven particularly successful in producing moldings which are highly heat-resistant. Particular moldings of this type are headlamp parts used in the vicinity of the headlamp, in which the temperature when the headlamp is operating can exceed 100° C., preferably 110° C. and particularly preferably 130° C., but is not more than 200° C. Parts of this type may either be glass-fiber-reinforced or not glass-fiber-reinforced.

The advantage of using the novel molding compositions is in particular that no matting of the surface occurs in headlamp parts of this type with a reflecting, metalized surface. The result of using the novel molding compositions is that, even after prolonged operation of the headlamp, there are no deposits on the transparent areas of the headlamp which transmit the light, and the reflective properties of metalized surfaces of these moldings are retained. The novel molding compositions may also be used for producing other headlamp components. These headlamp components include in particular headlamp housings, headlamp frames, headlamp retainers and headlamp guides, preference being given to headlamp frames.

The other advantageous properties of the novel molding compositions, such as low cycle times, no formation of mold deposits during injection molding, and excellent quality of the metalized surfaces, are also retained.

In particular, no clouding of the metalized surface occurs on heating the molding to from 100 to 200° C., preferably from 110 to 180° C. and particularly preferably from 130 to 170° C., and moldings may therefore be obtained which have metalized surfaces with long-lasting reflective properties.

The use of the novel molding compositions has also proven successful in producing large-surface-area moldings which are comparatively thin in relation to their surface area and for which excellent demolding performance is demanded. Particular large-surface-area moldings of this type are sunroof rails, exterior bodywork parts, air inlet grilles, dashboard parts, such as dashboard supports, protective covers, air ducts, add-on parts, in particular for the center console as a part of the glove compartment, and also protective surrounds for tachometers.

The invention further provides a composite which comprises a novel molding and a polycondensate foam. It is advantageous for there to be a firm bond between the surfaces of the molding and of the polycondensate foam. The composites feature excellent adhesion of the foam to the surface of the molding, without any requirement for this to be pretreated, for example using a primer. When the foam is pulled away or peeled away from the surface of the molding, cohesive fracture is found: residues of foam remain on the surface. The polycondensate foam used may be any foamable polycondensate known to the skilled worker. In another embodiment of the invention it is preferable for the foam to be applied to the surfaces of the molding without the use of a primer. Among these polycondensates, preference is given to polyamides and polyurethanes, particularly polyurethanes. Among the polyurethane foams, particular preference is in turn given to the semirigid or flexible foams, and these may, if desired, comprise adhesion promoter. A particular polyurethane foam used is Elastoflex® from Elastogran GmbH, Lemförde, Germany. Other suitable polyurethanes may be found in Kunststoffhandbuch Vol. 7 Polyurethane in the $3^{rd}$ edn., 1993, Karl Hanser Verlag, Munich, Vienna.

The invention also provides the use of the novel molding compositions for producing the moldings mentioned.

In addition, the invention provides a process for adjusting at least one of the properties defined above for a molding composition, preferably for a molding composition as claimed in any one of claims 1 to 6, by varying the concentration of at least one of the components defined above within the %-by-weight ranges defined above.

The examples below describe the invention in greater detail:

EXAMPLES

Examples 1 to 4 and Comparative Example

As shown in Table 1 below, the stated amounts of polybutylene terephthalate (PBT), polyethylene terephthalate (PET), glass fibers, graft rubbers P1 and P2, copolymers PSAN 1, PSAN 2 and PSAN 3 and additives were mixed in a screw extruder at from 250° C. to 270° C. Samples appropriate for the relevant DIN standards were injection-molded from the resultant molding compositions.

PBT1 is a polybutylene terephthalate with a viscosity number of 107 (determined in a 0.05 g/ml solution of polymer in phenol and 1,2-dichlorobenzene (1:1)).

PBT2 is a polybutylene terephthalate with a viscosity number of 130. P1 is a small-particle ASA graft rubber with 25% by weight of acrylonitrile in the SAN graft shell, with a median particle size of about 100 nm.

PC is the polycarbonate Lexan® from General Electric Plastics AG.

P2 is a large-particle ASA graft rubber with a median particle diameter of about 500 nm.

PSAN 1 is a styrene-acrylonitrile copolymer with 19% by weight of acrylonitrile.

PSAN 2 is a styrene-acrylonitrile copolymer with 35% by weight of acrylonitrile.

The mold-release agent is Loxiol VPG 861/3.5 from Henkel KGaA.

The carbon black is Black Pearls 880.

The talc is IT Extra

The glass fibers are chopped strands of standard glass.

Emission performance was assessed to PV 3341 and also to DIN 50011/PV 3900 C3.

Odor emission was measured to DIN 50011/PV3900 C3 as follows:

50 cm³ of sample material was tightly sealed in a 1 l vessel with odorless gasket and lid, and this was stored for 2 hours in a preheated heating chamber with air circulation at 80° C. The test vessel was removed from the heating chamber and cooled to 60° C. before assessment by at least 3 testers. Odor was assessed using the assessment scale with grades 1 to 6, with intermediate half grades permitted.

Assessment scale:

Grade 1 Not detectable

Grade 2 Detectable but not unpleasant

Grade 3 Clearly detectable but still not unpleasant

Grade 4 Unpleasant

Grade 5 Very unpleasant

Grade 6 Intolerable

Table 2 gives the results of the odor test and the results of the mechanical tests also carried out.

Laser inscription took place using an Na-YAg laser with a lamp current of about 15 A. The strength of contrast was assessed as "good" or "poor" by observing the legibility of the inscription.

TABLE 1

| Starting material [% by weight] | Example 1 | Example 2 | Example 3 | Example 4 | Example 5 |
|---|---|---|---|---|---|
| PBT 1 | | | 55.1 | | |
| PBT 2 | 47.5 | 55.1 | | 56.1 | 47.1 |
| Glass fiber | 20 | 15 | 15 | 14 | 14 |
| PET | 10 | | | | 10. |
| P 1 | 12 | 3 | 3 | | 8 |
| P 2 | | 3 | 3 | 6 | |
| PSAN 1 | | 15 | 15 | 15 | 15 |
| PSAN 2 | 10 | | | | |
| PC | | 8 | 8 | 8 | 5 |
| Mold-release agent | 0.5 | 0.5 | 0.5 | 0.5 | 0.5 |
| Talc | 0.1 | 0.1 | 0.1 | 0.1 | 0.1 |
| Carbon black | 1 | 0.3 | 0.3 | 0.3 | 0.3 |

TABLE 2

| | Example 1 | Example 2 | Example 3 | Example 4 | Example 5 |
|---|---|---|---|---|---|
| Flowability from MVR 275/2.16 [cm³/10 min] | 13 | 15 | 22 | 17 | 18 |
| Density [g/cm³] | 1.39 | 1.32 | 1.32 | 1.3 | 1.31 |
| Impact strength to ISO 179/1eU | 50 | 59 | 55 | 58 | 57 |
| Notched impact strength to ISO 179/1eA [kJ/m²] | 6 | 8 | 8 | 7 | 8 |
| Mod. of elasticity to DIN 53457 [MPa] | 6900 | 5300 | 5300 | 5000 | 5000 |
| Breaking stress to DIN 53457 [MPa] | 105 | 95 | 94 | 90 | 92 |
| Elongation at break to DIN 53457 [%] | 2.4 | 3.5 | 3.5 | 3.7 | 3.5 |
| Penetration energy to ISO 6603/2 [Nm] | 2.5 | 3.5 | 3.5 | 4 | 4 |
| HDT to ISO 75 B [° C.] | 143 | 140 | 139 | 139 | 143 |
| Odor test to PV 3900 C3 [Grade] | 4.5 | 3.5 | 3.5 | 3.5 | 4.0 |
| Laser inscription | poor | good | good | good | good |
| Carbon emission to PV 3341 [μg C/g] | 68 | 25 | 28 | 32 | 29 |

We claim:

1. A process for the production of fiber-reinforced moldings for motor vehicle interiors comprising the step of thermoforming, extruding injection molding, calandering, blow molding, compression molding, pressure sintering or sintering fiber-reinforced molding composition comprising, based on the total of components A to I, which in total give 100% by weight, a) as component A, from 1 to 96.86% by weight of at least one polyester, b) as component B, from 1 to 12% by weight of at least one particulate graft copolymer whose soft phase has a glass transition temperature below 0° C. and whose median particle size is from 50 to 100 nm, c) as component C, from 1 to 12% by weight of at least one copolymer made from the following monomers, as component C1, from 50 to 90% by weight of at least one vinylaromatic monomer, and c2 as component C2, from 10 to 50% by weight of acrylonitrile and/or methacrylonitrile, based in each case on component C.

d) as component D, from 1 to 20% by weight of fibers, e) as component E, from 0.1 to 15% by weight of a polycarbonate, f) as component F, from 0.01 to 2% by weight of a carbon black, g) as component G, from 0 to 12% by weight of a polymer other than component B, h) as component H, from 0 to 20% by weight of a polyester other than component A, i) as component I, from 0.1 to 10% by weight of additives, selected from the group consisting essentially of UV stabilizers, oxidation retarders, lubricants and mold-release agents or combinations thereof, for the production of moldings for motor vehicle interiors.

2. A process as claimed in claim 1, wherein the fiber reinforced molding compositions are injection molded.

3. A process as claimed in claim 1, wherein the fiber reinforced molding compositions are extruded.

4. A process as claimed in claim 1, wherein component A of molding compositions is composed of a1) from 60 to 100% by weight of polybutylene terephthalate and a2) from 0 to 40% by weight of another polyester.

5. A process as claimed in claim 1, wherein component B of the molding compositions is composed of b1) from 50 to 90% by weight of a particulate graft base B1 made from the following monomers b11) as component B22, from 75 to 99.9% by weight of a $C_1$–$C_{10}$-alkyl acrylate, b12) as component B12, from 0.1 to 10% by weight of at least one polyfunctional monomer having at least two non-conjugated olefinic double bonds, and b13) as component B13, from 0 to 24.9% by weight of one or more other copolymerizable monomers, and b2) from 10 to 50% by weight of a graft B2 grafted onto b1 made from the following monomers b21) as component B21, from 50 to 29% by weight of a vinylaromatic monomer, and b22) as component B22, from 10 to 50% by weight of acrylonitrile and/or methacrylonitrile.

6. A process as claimed in claim 1, where the polycarbonate of component E of the molding compositions has a flowability (MVR 300° C./1.2 kp $cm^3$/10 min ISO 1133) of from 9 to 100.

7. A process as claimed in claim 1, where the graft copolymer of component B of the molding compositions contains no butadiene derivative or no isoprene derivative, or neither of these.

8. Moldings for motor vehicle interiors prepared by a process as claimed in claim 1.

9. A process for the production of fiber-reinforced moldings for motor vehicle interiors comprising the step of thermoforming, extruding injection molding, calandering, blow molding, compression molding, pressure sintering or sintering fiber-reinforced molding composition comprising, based on the total of components A to I, which in total give 100% by weight, a) as component A, from 1 to 96.86% by weight of at least one polyester, b) as component B, from 1 to 12% by weight of at least one particulate graft copolymer whose soft phase has a glass transition temperature below 0° C. and whose median particle size is from 50 to 100 nm, c) as component C, from 1 to 12% by weight of at least one copolymer made from the following monomers, as component C1, from 50 to 90% by weight of at least one vinylaromatic monomer, and c2 as component C2, from 10 to 50% by weight of acrylonitrile and/or methacrylonitrile, based in each case on component C.

d) as component D, from 1 to 20% by weight of fibers, e) as component E, from 0.1 to 15% by weight of a polycarbonate, f) as component F, from 0.01 to 2% by weight of a carbon black, g) as component G, from 0 to 12% by weight of a polymer other than component B, h) as component H, from 0 to 20% by weight of a polyester other than component A, i) as component I, from 0.1 to 10% by weight of additives, selected from the group consisting essentially of UV stabilizers, oxidation retarders, lubricants and mold-release agents or combinations thereof, for the production of moldings for motor vehicle interiors wherein component B of said molding compositions comprise from 10 to 90% by weight of a small-particle graft copolymer with a median particle size from 250 to 1000 nm.

10. Moldings from vehicle interiors comprising the moldings prepared as in claim 9.

* * * * *

UNITED STATES PATENT AND TRADEMARK OFFICE
CERTIFICATE OF CORRECTION

PATENT NO. : 6,605,665 B1  Page 1 of 1
DATED : August 12, 2003
INVENTOR(S) : Fischer et al.

It is certified that error appears in the above-identified patent and that said Letters Patent is hereby corrected as shown below:

<u>Column 16,</u>
Line 4, "9to 100" should be -- 9 to 100 --;
Line 46, "comprise" should be -- comprises --;
Line 50, "from" should be -- for --.

Signed and Sealed this

Thirtieth Day of September, 2003

JAMES E. ROGAN
*Director of the United States Patent and Trademark Office*